[72] Inventor Donald Harwood Newhall
Norfolk, Mass.
[21] Appl. No. 820,466
[22] Filed Apr. 30, 1969
[45] Patented Dec. 28, 1971
[73] Assignee Harwood Engineering Company
Walpole, Mass.

[54] FREE PISTON GAUGING APPARATUS
10 Claims, 11 Drawing Figs.
[52] U.S. Cl...................................................... 73/4 D,
73/141 R, 73/419
[51] Int. Cl....................................................... G01l 7/16,
G01l 27/00
[50] Field of Search........................................... 73/4, 141,
419; 177/208; 308/6 B

[56] References Cited
UNITED STATES PATENTS
| 1,154,018 | 9/1915 | Hopkins | 73/4 D |
| 1,878,835 | 9/1932 | Fleishmann et al. | 73/141 |
| 2,369,926 | 2/1945 | Thornhill et al. | 308/6 B |
| 2,610,508 | 9/1952 | Stein | 73/419 |
| 2,796,229 | 6/1957 | Newhall | 73/4 D |
| 3,047,005 | 6/1962 | Karr | 73/4 D X |
| 3,177,958 | 4/1965 | Link | 177/208 |
| 3,285,061 | 11/1966 | Hegenbart | 177/208 X |

OTHER REFERENCES
Johnson et al. Review of Scientific Instruments Vol. 38, No. 9, Sept. 1967 pp. 1,294– 1,300

*Primary Examiner*—S. Clement Swisher
*Attorney*—Maxwell Fish

ABSTRACT: A free piston gauging apparatus having pressure cylinders and pistons with spherically formed cylinder wall engaging surfaces providing a line contact between the piston and cylinder wall. The apparatus includes a pressure cylinder closed at one end and open at the other end, a piston having a spherically shaped piston-to-cylinder contact surface which provides a line contact between the piston and cylinder wall, said piston being freely movable axially and in rotation within the cylinder and providing a sharp pressure drop across the transverse diameter of the spherically formed piston from the closed end to the open end of the cylinder, a ram extension of said piston, which may be separate or integral with the piston, loosely fitted into the open end of the cylinder, means for applying a loading force against the ram extension, a balancing pressure applied against the spherical piston through the closed end of the cylinder, and a gauge responsive to said balancing pressure.

The pressure cylinder may be jacketed for the application of external pressure which is adjustable with relation to the internal pressure to provide a controlled clearance between the cylinder and associated spherically formed piston.

Five embodiments of the invention are here shown. These embodiments include a simple free piston deadweight loading pressure calibrating gauge, and a force-measuring free piston gauge, each of these embodiments having a pressure cylinder and a spherical piston and ram assembly well adapted for the making of more accurate and reliable measurements than heretofore achieved. Two additional embodiments of the invention illustrate respectively a differential free piston pressure multiplying calibrating gauge and a differential area free piston deadweight loading pressure calibrating gauge, each having two opposed pressure cylinders with spherical pistons and a ram spacer, of which the pressure multiplying apparatus has an input loading cylinder and spherical piston of larger diameter than the balancing cylinder and piston, while the differential area deadweight loading apparatus has an input loading cylinder and spherical piston of smaller diameter than the balancing cylinder and piston. The last embodiment shown is a force-measuring gauge similar to that shown in FIGS. 3 and 4 of the drawings, of which the spherically formed cylinder wall engaging surfaces of the piston and the ram formed as an extension of the piston of smaller diameter are combined in a single element.

FREE PISTON GAUGING APPARATUS

The present invention related to improvements in free piston gauging apparatus for making precise measurements of forces and pressures, and more particularly to free piston pressure gauging apparatus, of which at least portions of the piston element are spherically shaped, providing a line contact between the spherically shaped piston and the cylinder wall, which determines exactly the point at which a pressure drop from one side to the other of the spherical piston takes place, and which makes possible a very exact calculation of the area against which pressure is applied.

A free piston high-pressure gauging apparatus capable of calibrating gauges and the like has been developed as shown in the prior patent to Newhall U.S. Pat. No. 2,796,229, dated June 18, 1957 for Pressure Cylinder Unit and Method. Newhall U.S. Pat. No. 3,296,855 dated Jan. 10, 1967 for Pressure Cylinder Type Measuring Apparatus discloses a free piston force-measuring load cell, comprising a jacketed pressure cylinder unit which is acted upon in one direction by a force or weight to be measured and in the opposite direction by a known balancing pressure exerted over a known piston area. And, while spherical pistons are known in the art, as illustrated by the U.S. Pat. to Sykes U.S. Pat. No. 2,716,917 dated Sept. 6, 1955 for Free Piston Engine, and by the U.S. Pat. to Carmichael U.S. Pat. No. 2,251,259 dated Aug. 5, 1941 for Piston and Cylinder Construction, no anticipation has been found for applicant's improved combination in a free piston gauging apparatus, of a free piston having a spherically formed cylinder contact surface and a cooperating pressure cylinder adapted for producing precision measurements of forces and pressures.

It is a principal object of the invention to provide free piston gauging apparatus provided with pressure cylinder and spherical-type free piston assemblies, which will measure forces and pressures of any magnitude with a substantially greater degree of precision, accuracy and sensitivity than heretofore considered possible with free piston gauging devices of the prior art.

With the above and other objects in view as may hereinafter appear, a principal feature of the invention consists in the provision of a free piston force and pressure-measuring apparatus of this general description in which a pressure cylinder is assembled with a piston having a spherically formed cylinder wall contact surface, so that contact between the piston and cylinder wall is limited to a single circular line of tangency, thus permitting a precise determination of the location at which the loading pressure or balancing pressure at the closed end of the cylinder drops from one side of the piston to the other, and an equally precise determination of the effective diameter of the spherical piston.

Several embodiments of the invention are shown including a simple deadweight tester having a pressure cylinder open at one end and jacketed for the application of fluid pressure to control expansion of the cylinder walls under an internally applied pressure, and a ram for transmitting a known force to the open end of the pressure cylinder, in which there is provided a free piston having a spherically shaped piston engaging surface providing a line contact with the cylinder walls limited to a single circular line of tangency between the cylinder wall and piston.

Another embodiment of the invention comprises a load cell having a pressure fluid jacketed cylinder open at one end, a ram acting against the open end of the cylinder, a pressure-measuring gauge, and a free piston having a spherically shaped piston engaging surface providing a line contact with the cylinder walls limited to a single circular line of tangency between the cylinder wall and piston.

In two further embodiments shown a plurality of pressure cylinders, including at least two such cylinders, are provided, each having an open end, said open ends being arranged in opposed aligned relation, and spherical pistons separated by a ram spacer. This combination of the spherical pistons and the ram spacer provides a perfect universal joint which eliminates any friction loss due to any slight misalignment of the pressure cylinders and their contained spherical pistons. The spherical pistons will preferably be of different diameter chosen with relation to the forces and pressures acting in opposite directions on said pistons to establish a balance between the opposed spherical pistons. One of the two embodiments of the invention above referred to comprises a free piston pressure multiplier or intensifier suitable for making primary pressure measurements. The apparatus includes two aligned pressure cylinders with their open ends in opposed relation, the upper loading cylinder and piston being of larger diameter, and a ram spacer interposed between said pistons. With fluid in both loading portions, the pressure under the lower and smaller piston is inversely proportional to the areas of said pistons. The other of the two embodiments above referred to comprises a differential free piston pressure-measuring gauge. The apparatus illustrated comprises opposed pressure cylinders fitted with spherical pistons of different diameter suitable for making primary pressure measurements, where the lower spherical piston and cylinder are larger. In this embodiment of the invention the same pressure is supplied to both pistons by a suitable pressure generator. The difference in areas creates an unbalanced force proportional to the pressure. The unbalance force is counterbalanced by an opposing weighing system as, for example, with deadweights.

In another embodiment of the invention there is shown a load cell having a piston with spherically shaped piston contact surfaces of sufficient extent to provide a line contact between the piston and cylinder wall limited to a single circular line of tangency, and in which the associated ram of smaller diameter is formed integral with the piston as an extension thereof.

The several features of the invention consist also in the devices, combinations and arrangements of parts hereinafter described and claimed, which together with the advantages to be obtained thereby will be readily understood by one skilled in the art from the following description taken in connection with the accompanying drawings, in which FIG. 1 is a view partly in section and partly diagrammed of a controlled clearance free piston deadweight tester having a spherical piston which is connected by a ram with a loading platform and weights, and a cylinder jacketed for the application of a jacket pressure adjustable to provide a leakage clearance between the piston and cylinder wall;

Figure 1:
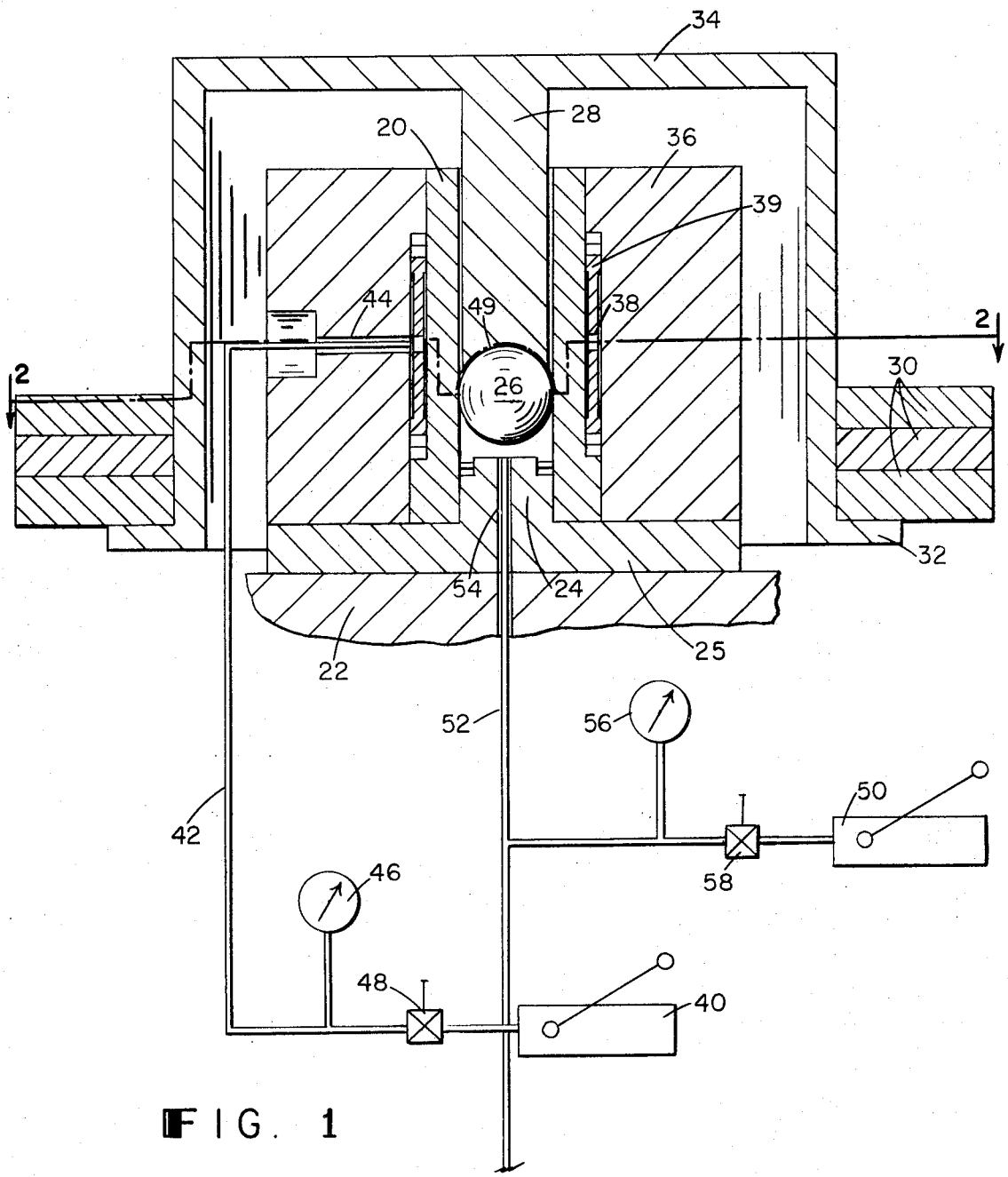
Figure 2:
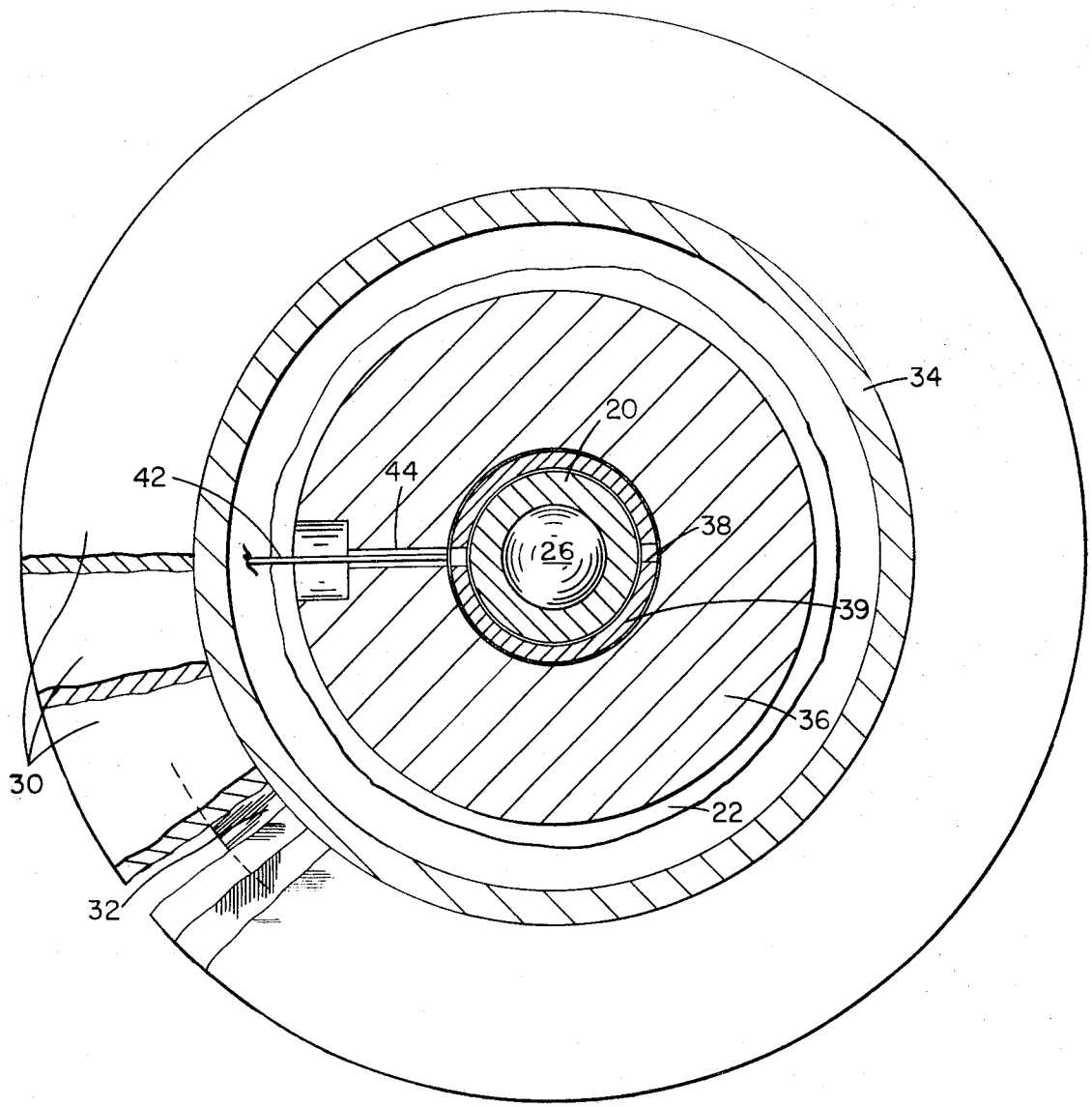
FIG. 2 is a horizontal section taken on a line 2—2 of FIG. 1.

Referring to the drawings, the deadweight tester illustrated in FIG. 1 comprises a free piston pressure cylinder unit including a cylinder 20 which is set vertically on a base 22 and is closed at the lower end by a plug 24 and a bottom plate 25, and a free piston which in accordance with the present invention takes the form of a sphere 26 which is acted upon from above by means of a ram 28 loosely fitted within the cylinder 20. A downward pressure is exerted on the ram and piston by a series of doughnut-shaped weights 30 carried on the outwardly flanged edge 32 of a weight carrier 34, which has generally the shape of an inverted cup and is balanced on the upper end of the ram 28. The pressure cylinder 20 is surrounded by a heavy jacketing cylinder 36 which is arranged to provide a cylindrical jacketing chamber 38 about the pressure cylinder 20 to which a fluid such as oil is supplied at an adjusted jacketing pressure. A thin cylindrical filler member 39 is loosely fitted within the chamber 38. It will be understood that the jacketing pressure which supports and controls the degree of expansion of the cylinder wall produced by the loading pressure within the cylinder, will always be less than the loading pressure. The jacketing pressure is supplied by means of a jacket pressure generator conventionally indicated at 40 as a manually operable pump, and a supply line 42 connected through a channel 44 with the cylindrical jacketing chamber 38. A gauge 46 connected into the supply line 42 provides a direct reading of the jacketing pressure. A pressure shutoff or isolation valve 48 permits the supply line 42 to be closed off when the desired jacketing pressure has been achieved. It will be noted that a layer of a relatively soft load-distributing material 49, such as Teflon, interposed between the spherical piston and a cooperating spherically formed bearing surface of the ram 28 ensures a uniform distribution of load on the upper side of the spherical piston.

An opposed balancing pressure is applied to the lower side of the spherical piston 26 by means of a manually operable pressure generator 50, which is connected to a supply line 52, and a channel 54 which passes through the plug 24 into the lower end of the pressure cylinder 20. A gauge 56 or other similar device to be calibrated by the deadweight tester and a pressure shutoff or isolation valve 58 are also connected into the pressure supply line 52.

The spherical piston, acted upon by the ram 28, provides a friction-free arrangement in which a line contact only is permitted between the piston and cylinder about the transverse diameter of the piston. Since this diameter is known accurately it is possible to calculate with increased precision the effective diameter of the cylinder at the exact point of the pressure drop and consequent area over which the known weight and force of the deadweight tester weights are applied, with a resulting more precise calibration of the gauge 56.

Figure 3:
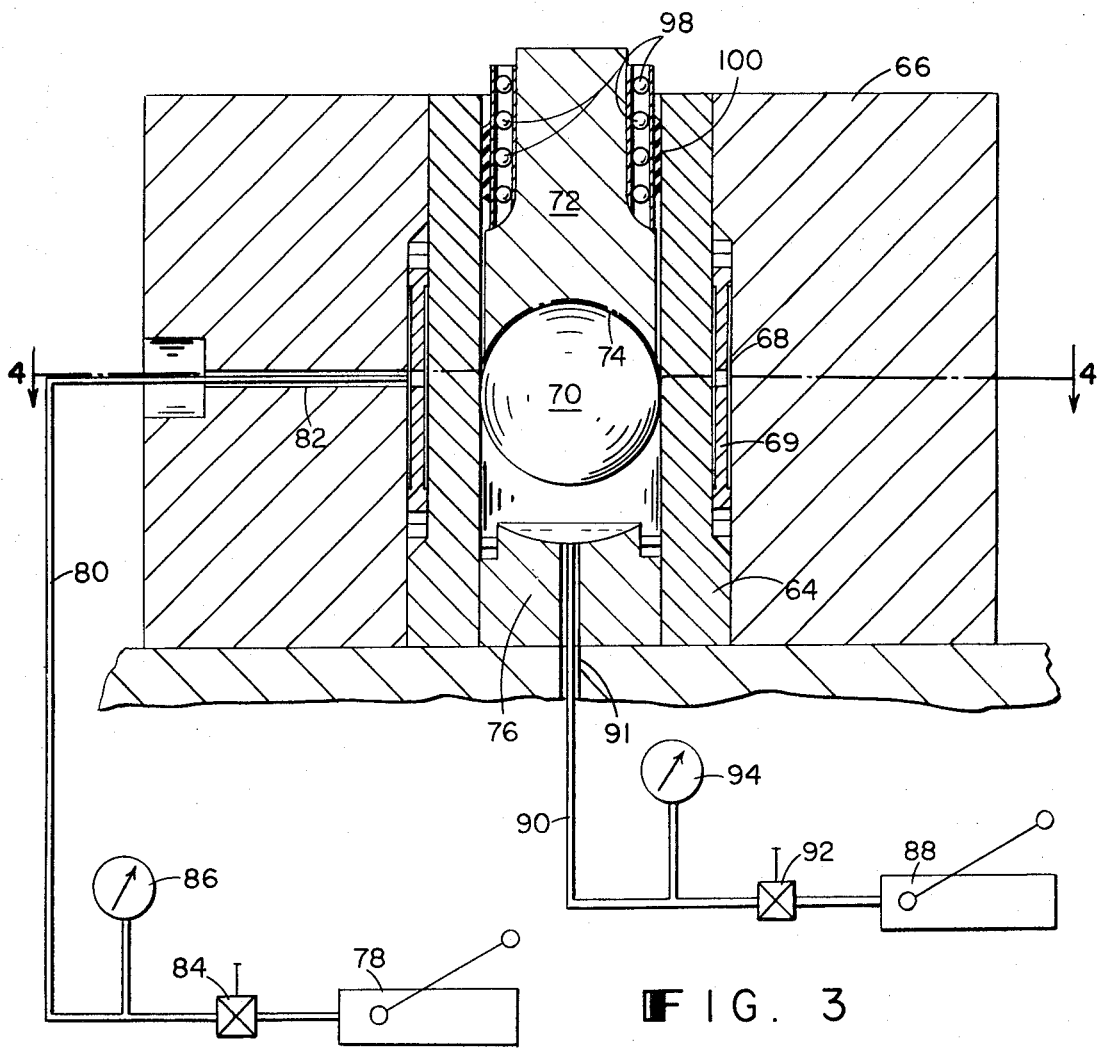
FIG. 3 is a view partly in section and partly diagrammed of a free piston load cell having a spherical piston arranged to be acted upon by a ram driven by a suitable loading force to be measured, and a cylinder jacketed for the application of a jacketing pressure.
Figure 4:
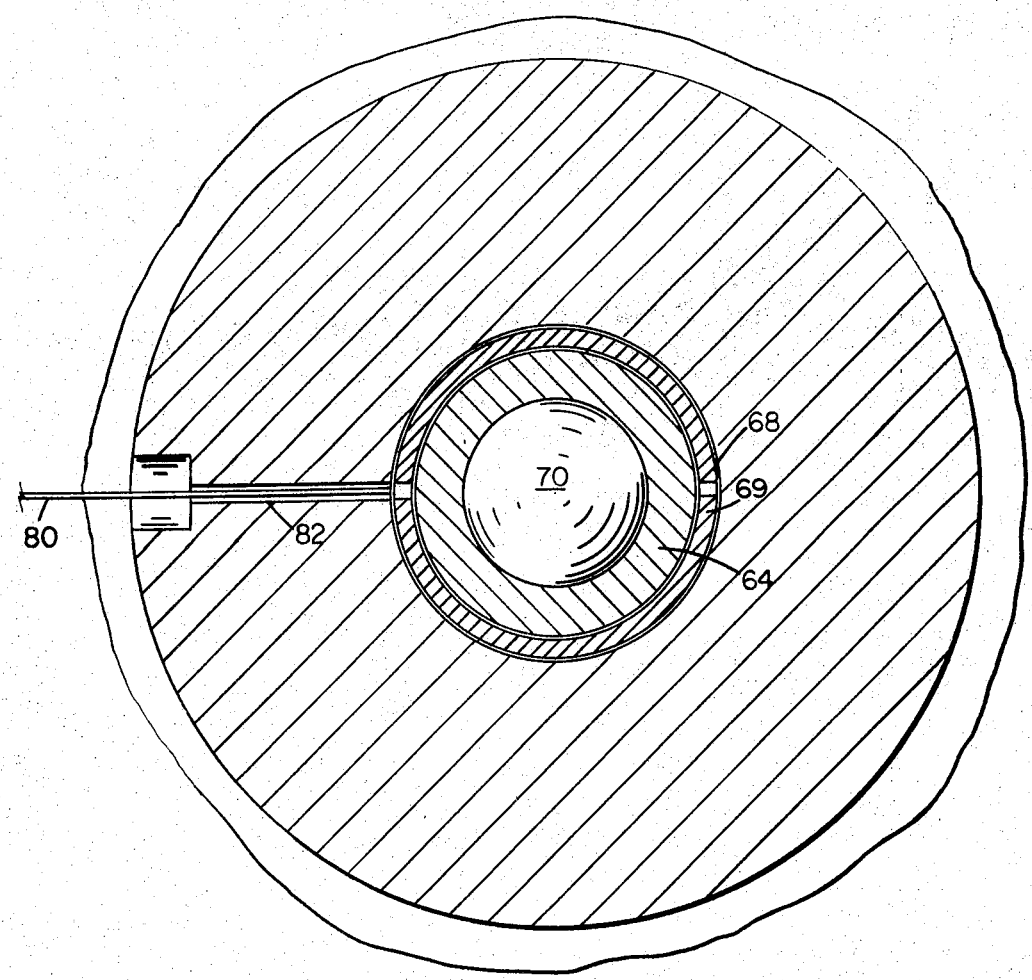
FIG. 4 is a horizontal section taken on a line 4—4 of FIG. 3.

FIGS. 3 and 4 illustrate a modification of the invention, in which apparatus similar to that above described including a jacketed cylinder and a spherical piston, is employed as a load cell. The embodiment of FIGS. 3 and 4 comprises a pressure cylinder 64, a jacketing cylinder 66 providing a pressure fluid receiving cylindrical chamber 68 containing a thin cylindrical spacer 69, a spherical piston 70, and a loosely fitting ram 72 having the lower end formed as a spherical bearing for engagement with the spherical piston 70. A layer of a soft load-distributing material 74, such as Teflon, is interposed between the spherical piston 70 and the spherically formed bearing surface of the ram 72. The lower end of the cylinder 64 is closed by a plug 76.

A jacketing pressure is applied to the cylindrical chamber 68 by means of a jacket pressure generator 78 connected by a supply line 80 with an inlet channel 82 to the cylindrical chamber 68. A balancing pressure is applied to the lower side of the spherical piston 70 by means of a pressure generator 88 which is connected by a supply line 90 and a bore 91 in the plug 76 with the lower end of the piston receiving chamber of the cylinder 64. An isolation valve 92 and a load pressure measurement gauge 94 are connected into the supply line 90.

The apparatus above described must be substantially friction free in order to operate efficiently as a load cell. When the jacketing pressure is properly adjusted to provide a leakage fit between the spherical piston 70 and the supporting wall of cylinder 64 the friction loss at this point becomes so small as to be negligible. The soft Teflon-lined bearing 74 provided between the spherical piston 70 and the ram 72 provides a uniform distribution of the load. And sufficient clearance is provided between the ram 72 and the wall of the cylinder 64 to avoid contact therebetween. To avoid friction losses which might result from any misalignment of the spherical piston and its ram 72 through which the loading force to be measured is transmitted, the ram is preferably slideably mounted within an antifriction ball bearing sleeve 98 (see FIG. 3), which is in turn cushioned within a rubber sleeve mounting 100 fitted to the internal wall of the pressure cylinder 64. A ball bearing sleeve of this description is commercially available having a friction coefficient of less than 0.002.

The load cell of FIGS. 3 and 4 may be employed, by way of example, to obtain an accurate measurement of the weights 30 contained in the deadweight tester of FIG. 1. The weight carrier 34, for this operation, would be balanced on the upper end of the ram 72, causing the weights 30 to exert a loading force downwardly on the ram 72. Further, it will be understood that the load cell measures forces usually greater than those used in a pressure-free piston gauge, such as the enormous forces of from 1 to 10,000,000 pounds encountered in rocketry. The load cell here shown, making a primary measurement, would be more apt to be used to calibrate other less sophisticated load cells. A load cell constructed as above described to include the jacketed pressure cylinder and spherical piston assembly, the antifriction ball bearing sleeve and supporting sleeve mounting has been found to provide measurements of force which are substantially more accurate and precise than previously considered possible, and which compare favorably in accuracy and precision with measurements of comparable forces measurable on a deadweight loading machine.

FIGS. 5 and 6, and FIGS. 7 and 8 of the drawings illustrate respectively two modified arrangements of a free piston measuring apparatus having spherical pistons and jacketed cylinders to which a fluid medium is supplied at pressures adjusted to maintain a friction-free leakage fit between each spherical piston and the adjacent cylinder wall.

Figure 5:
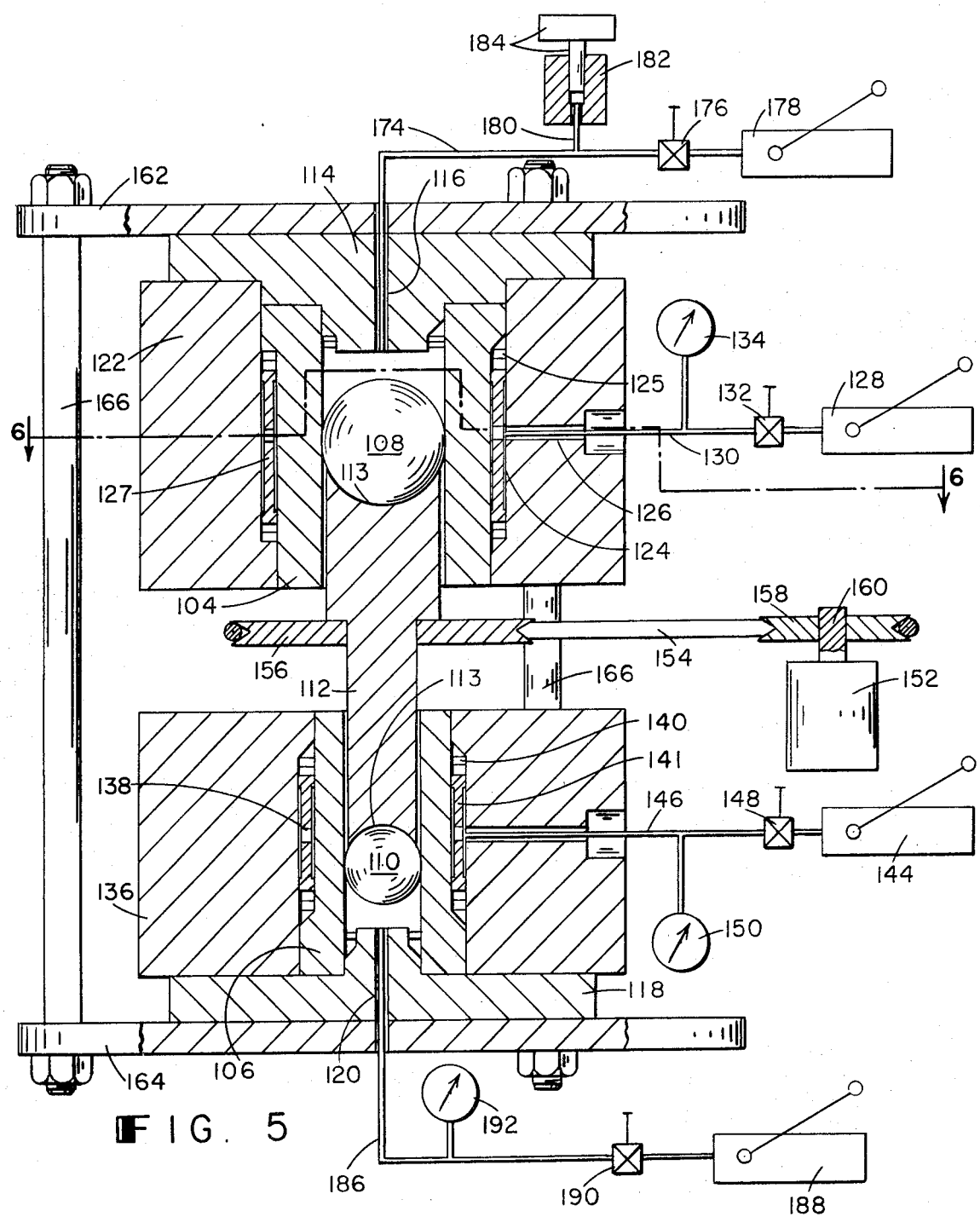
FIG. 5 is a view partly in section and partly diagrammed of a differential free piston deadweight tester arranged as a pressure multiplier having two pressure cylinders arranged with the open ends thereof in opposed end to end relation and fitted with spherical pistons, the upper input cylinder and piston being of larger diameter, a ram spacer interposed between said spherical pistons.
Figure 6:
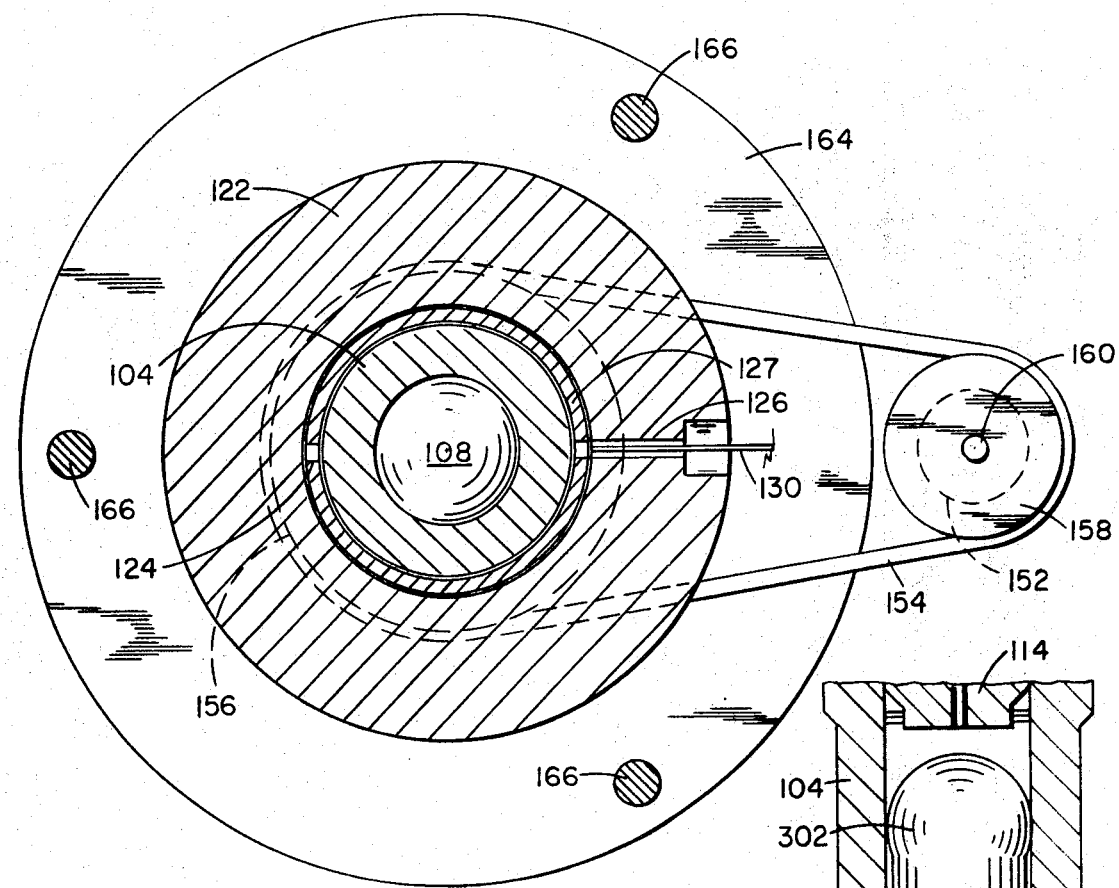
FIG. 6 is a horizontal section taken on a line 6—6 of FIG. 5.

More specifically, FIGS. 5 and 6 illustrate a free piston multiplier-type deadweight tester of the general description having two oppositely facing aligned pressure cylinders 104, 106 fitted respectively with spherical pistons 108, 110, which are separated by a ram spacer 112, of which the cylinder entering portions are of less diameter than the inner walls of the respective cylinders. The ram spacer 112 is formed at each end with spherical bearing surfaces lined with a relatively soft load-distributing material 113, for example, Teflon. The outer end of the cylinder 104 is closed by a plug 114 having an axial inlet passage 116. The outer end of cylinder 106 is similarly closed by a plug 118 having an axial inlet passage 120. A heavy jacketing cylinder 122 fitted over the pressure cylinder 104 provides a cylindrical jacket chamber 124 closed at each end by packings 125. A thin sleeve filler 127 is loosely fitted within the chamber 124. Pressure fluid, which may be oil, is supplied to the jacket chamber 124 through a duct 126 from a manual pressure generator 128, and an inlet line 130 having connected thereto a shutoff or isolation valve 132 and a jacket pressure-measuring gauge 134. The pressure cylinder 106 is similarly provided with a jacketing cylinder 136 providing a cylindrical jacket chamber 138 closed in by packings 140 and containing a loosely fitted sleeve member 141. Pressure fluid is supplied to the jacket chamber 138 from a manual pressure generator 144 through an inlet line 146 having connected thereto a shutoff or isolation valve 148 and a jacket pressure-measuring gauge 150. To further ensure the maintenance of a friction-free condition between the spherical pistons 108, 110 and the walls of the respective cylinders the spacer 112 is arranged to be continuously rotated by connections which include a motor 152 and a belt 154 which passes around a pulley 156 on the ram spacer 112 and a pulley 158 on the motor shaft 160. The entire pressure cylinder assembly including pressure cylinder 104 and pressure cylinder 106 and plugs 114 and 118 are rigidly mounted within a frame consisting of an overlying press piston 162 and an underlying press platen 164 to which the plugs 114 and 118 are secured, and three tie rods 166 connecting the two press platens adjacent their outer edges.

The apparatus described in connection with FIGS. 5 and 6 is further provided with a fluid pressure inlet line 174 having a shutoff or isolation valve 176 and a manually operable pressure generator 178, and into which is connected the output line 180 of a deadweight tester which may be similar to that shown in FIG. 1, and which is here shown conventionally as including a pressure cylinder 182 and associated weight-actuated ram 184. The passage 120 to the pressure cylinder 106 has connected thereto a manually operable pressure generator 188 and connections which include a manually operable shutoff or isolation valve 190 and a pressure gauge 192.

The free piston pressure multiplier-type deadweight tester calibrating apparatus of FIGS. 5 and 6 operates in the following manner. The apparatus is set up to calibrate accurately a pressure-measuring device symbolically indicated by the pressure gauge 192. The hand pump 188 and isolating valve 190 serve to charge the space under the spherical piston 110 with fluid through line 186 lifting the spherical pistons 110, 108 and their supporting ram spacer 112. Leakage past piston 110 is controlled by the manually operated pump 144 which introduces pressure into the jacket chamber 138 through the inlet line 146. Said pressure, which is locked in by the isolating valve 148 and is measured by pressure gauge 150, is built up to a value normally less than the pressure under the spherical piston 110 in order to control outward distortion of cylinder 106 and thereby to maintain a suitable leakage fit between the piston and cylinder wall. Pressure is built up in the lower end of cylinder 106 by creating a pressure at the upper end of cylinder 104. This pressure is supplied to the upper end of the cylinder by the pressure generating system shown symbolically by the manually operated pump 178, the isolating valve 176, and the precise measuring device shown as the free piston gauge 182, 184. Leakage past the spherical piston 108 is controlled by pressure in the jacketing chamber 125 built up by the pumping system which includes the manually operated pump 128, the isolation valve 132 and the pressure-measuring gauge 134. The controlled pressure supplied to the jacket chamber prevents outward distortion of the cylinder 104. It will be noted that the pressure built up in the lower end of cylinder 106 is related to the pressure at the upper end of cylinder 104 in the inverse ratio of their areas. The relation of the pressures in cylinders 106 and 104 may be expressed algebraically as follows: If the piston 108 has an area "$A$" and is loaded with pressure "$p$" and piston 108 has an area "$a$," the pressure "$P$" will be developed in cylinder 106 vis $$Ap = Pa$$

For friction free operation of the pistons, mechanism is provided for continuously rotating pistons 108 and 110 while held out of contact with the respective plugs 114, 118. The pistons are rotated by the motor 152 acting through pulleys 156, 158 and belt 154 to rotate the ram spacer 112, which in turn rotates pistons 108 and 110 by virtue of the friction created by the interfaces 113 of soft load-distributing material between the ram spacer 112 and the pistons 108 and 110. It will be noted that the piston 108, the piston 110 and the ram spacer 112, frictionally engaged as above described, are constrained to move as a unit, and could, therefore, be constructed as an integral unit without altering the function or operation of the apparatus in any respect.

An important advantage gained by applicant's arrangement of two pistons having spherically formed bearing surfaces providing a transverse line contact with the cooperating cylinder walls, and a separating ram spacer, consists in the fact that these elements provide a friction-free universal joint which is substantially unaffected by any slight misalignment of the two pressure cylinders. Accurate alignment is not here as important or critical as it would be if the pistons were of the cylindrical type, in which case alignment for friction-free operation would have to be perfect within a very few millionths of an inch.

Figure 7:
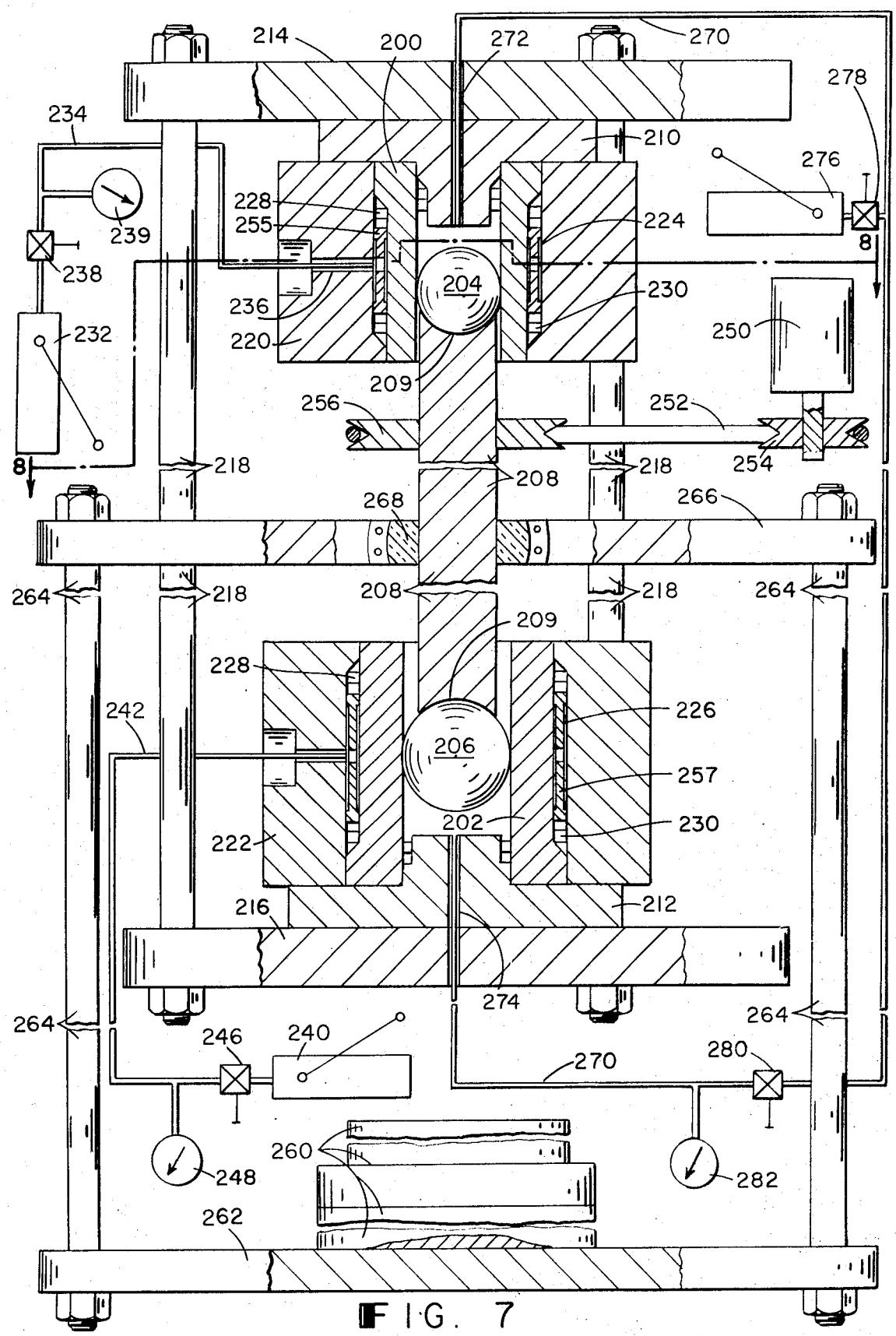
FIG. 7 is a view partly in section, and with certain parts shown diagrammatically, of a clearance control free piston gauge having two pressure cylinders arranged with the open ends in end-to-end relation and fitted with spherical pistons, and with the upper input piston of smaller diameter, and a ram spacer interposed between said spherical pistons.
Figure 8:
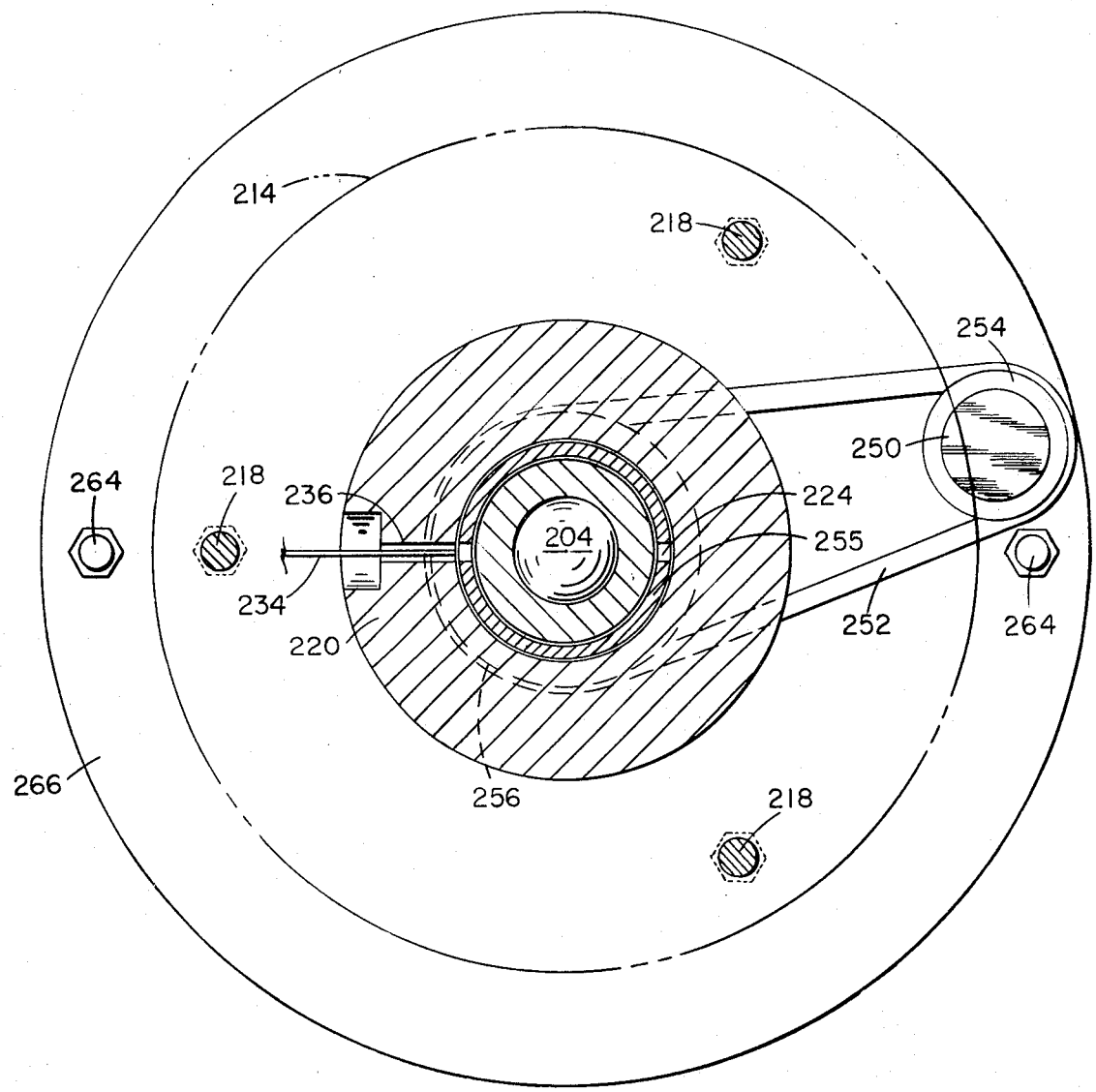
FIG. 8 is a horizontal section taken on a line 8—8 of FIG. 7.

FIGS. 7 and 8 of the drawings illustrate a further embodiment of the invention in a deadweight differential free piston gauge. The apparatus comprises two oppositely facing aligned pressure cylinders 200, 202 fitted respectively with spherical pistons 204, 206 which are separated by a spacer 208 loosely supported within the cylinder walls. At each end the ram spacer 208 is formed with a spherical bearing surface and is provided with a relatively soft liner 209, which may, for example, be Teflon, to distribute the contact pressure between said ram spacer 208 and the spherical pistons 204 and 206. The outer ends of the pressure cylinders are closed by plugs 212, 210 secured respectively to press platens 214, 216 which are connected by three rods 218 to form a rigid supporting frame. The press platen 216 is supported at floor level and forms a base on which the entire apparatus is mounted. Jacketing cylinders 220, 222 fitted respectively over the pressure cylinders 200, 202 are formed to provide cylindrical jacket chambers 224, 226, which are closed in on each side by packings 228, 230. A pressure fluid, such as oil, is supplied to the jacket chamber 224 by means of a manually operable jacket pressure generator 232 connected by a pipeline 234 and an inlet duct 236 to chamber 224. A shutoff or isolation valve 238 and a jacket pressure-measuring gauge 239 are connected into the pipeline 234. Fluid under pressure is similarly supplied to the jacket chamber 226 associated with the lower pressure cylinder 202 by means of a manually operable jacket pressure generator 240 connected by a pipeline 242 and an inlet duct with the jacket chamber 226. A shutoff or isolation valve 246 and a jacket pressure-measuring gauge 248 are connected into the pipeline 242. The pressure supplied to each of the jacket chambers 224 and 226 is adjusted to control outward distortion of the cylinder walls when subjected to heavy piston pressures in order to maintain a leakage fit between the cylinder walls and associated pistons. In order to dissipate any frictional resistance which may develop in the apparatus the ram spacer 208 is arranged to be continuously rotated by connections which include a motor 250 which is connected by a belt 252 and pulleys 254, 256 to the ram spacer 208. Cylindrical filler sleeves 255 and 257 are loosely mounted in the jacket chambers 224 and 226 respectively as shown in FIG. 7.

In the embodiment of FIGS. 7 and 8 the ram spacer 208 is forced downwardly by weights 260 of known mass which are mounted on a table 262 suspended below floor level by connecting rods 264 from a crossbar 266 which is mounted to swivel freely on a spherical bearing 268 secured to the spacer 208. Fluid pressure is supplied to the two spherical pistons 204, 206 in opposed directions and always at the same level of pressure from an input line 270, one end of which is connected by a central bore 272 in the plug 210 with the upper end of cylinder 200, the other end being connected by a central bore 274 with the lower end of cylinder 202. Fluid pressure is built up in the input line 270 and equally in the respective cylinders by a manually operable pressure generator 276. A shutoff or isolation valve 278 in the input line 270 adjacent the cylinder 200, and a shutoff or isolation valve 280 adjacent the cylinder 202 are operable to shut off the flow of fluid pressure to or from either of said pressure cylinders. A gauge to be calibrated by the apparatus designated at 282 is connected into the inlet line 270. In this embodiment of the invention the upper input spherical piston 204 is preferably of smaller diameter than the lower spherical piston 206.

The free piston differential-type deadweight gauging apparatus of FIGS. 7 and 8 operates in the following manner:

If the effective area of the larger piston 206 is known as "$A$" and the effective area of smaller piston 204 is known as "$a$," then the difference in areas is known as the algebraic quantity $A-a$ which is a differential area $A$. An upward thrusting force of the piston 206 carrying with it the associated ram spacer 208 and the piston 204 results when the same pressure "$p$" is introduced simultaneously into the pressure holding cavities of cylinders 200 and 202. The magnitude of the thrusting forces stated algebraically is $p \times P$. This force is counterbalanced by deadweights 260 referred to algebraically as "$W$." When the pistons 206 and 204 and the ram spacer 208 are in a floating and equilibrium position, i.e. with piston 204 free of contact with plug 210 and piston 206 free of contact with plug 212, and with the pistons and ram spacer rotating free of friction against the walls of cylinders 200 and 202, the pressure established in the pipeline 270 and at the gauge undergoing calibration is given algebraically by the expression $$p = W/A$$

It is assumed that piston sizes and weights will be selected of such magnitudes as will produce desired and convenient steps or increments of pressure in accordance with procedures customarily followed during employment of free piston gauges existing in the prior art.

Figure 9:
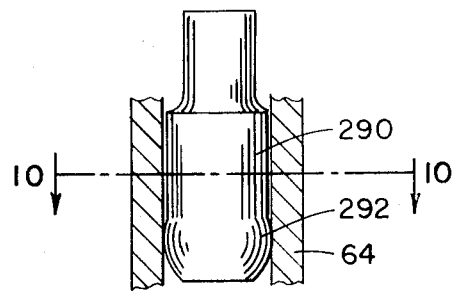
FIG. 9 is a view partly in section and partly diagrammed of a free piston load cell in which the ram and spherical piston are combined in a single element comprising spherically formed cylinder wall engaging surfaces and a ram of smaller diameter formed integrally with said surface.
Figure 10:
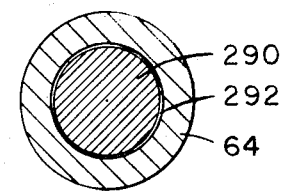
FIG. 10 is a horizontal section taken on a line 10—10 of FIG. 9.

FIGS. 9 and 10 of the drawings illustrate a modification of the spherical piston and ram elements of the load cell illustrated in FIGS. 3 and 4, in which these elements are combined in a single unitary construction. The combined spherical piston and ram unit designated generally by reference character 290 is formed at the lower end with a spherically shaped bearing surface 292 having a transverse line contact with the wall of pressure cylinder 64, and an adjacent ram extension 294 of smaller diameter to fit loosely within the cylinder walls. The upper end portion 296 of the combined spherical piston and ram unit 290 is cylindrical in form and still further reduced in size to receive the antifriction ball bearing sleeve 98 of FIG. 3.

When the unitary spherical piston and ram extension unit of FIGS. 9 and 10 is compared with the assembled spherical piston 70, ram 72 and interposed friction liner 74, it will be noted that the piston 70 and ram 72 are constrained to move longitudinally and to rotate as a unit in the same manner as the piston and ram extension unit of FIGS. 9 and 10. These assemblies are freely interchangeable and may be regarded as equivalents.

Figure 11:
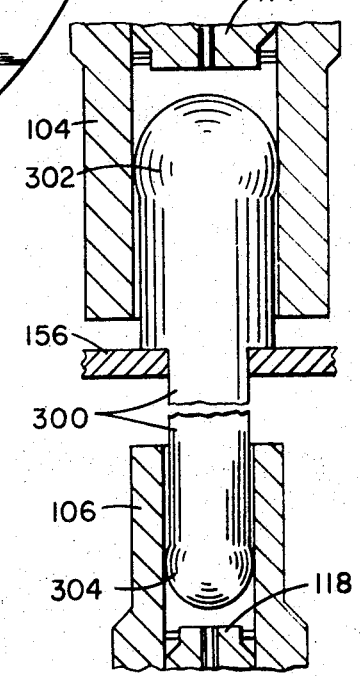
FIG. 11 is a view partly in section illustrating a unitary double piston and ram spacer assembly replacing the piston and ram spacer assembly of FIG. 3.

FIG. 11 discloses a modification of the embodiment of FIGS. 5 and 6, which comprises a unitary ram spacer and spherical piston assembly including a ram spacer 300 having the end portions thereof spherically formed to provide an integral ram spacer and spherical piston unit. The spherical surfaces designated at 302 and 304 engage respectively the walls of cylinders 104 and 106. This unitary ram spacer and spherical piston assembly is freely interchangeable with the spherical piston and ram spacer assembly of FIGS. 5 and 6, and operates in the same manner.

While certain specific forms of the invention have been shown and described, it will be understood that various changes may be made therein, some of which have been indicated, without departing from the spirit of the invention as defined in the appended claims.

What is claimed is:

1. In a free piston gauging apparatus having a pressure cylinder and piston assembly including a pressure cylinder closed at one end, a piston and ram assembly including a free piston, and an associated ram loosely fitted within the cylinder to maintain a leakage clearance fit between the cylinder and piston comprising a fluid-containing jacket surrounding said cylinder, and means for supplying a fluid to said jacket at an adjusted jacketing pressure, means for applying a loading force against the ram, a balancing pressure source, a passageway connecting the balancing pressure with the closed end of the cylinder, and a gauge responsive to said balancing pressure, the combination in which at least portions of said piston are spherically formed providing an unbroken circular line contact between said spherically formed piston portions and the cylinder wall transversely about the cylinder enclosing the area of said piston precisely at said point of contact providing an exact measure of said piston area, and of the total pressure applied against said piston area.

2. A free piston gauging apparatus according to claim 1, in which the piston is a sphere, and the ram is loosely fitted within the cylinder to be held against the spherical piston by said loading force.

3. A free piston gauging apparatus according to claim 1, in which the piston and ram are formed as an integral piston and ram extension unit, said piston having spherically formed surfaces of sufficient extent to provide a line contact between said surfaces and the cylinder wall, and a ram extension integral with said piston loosely fitted within the cylinder.

4. A free piston gauging apparatus according to claim 3, in which the free piston gauging apparatus is a load cell.

5. A free piston gauging apparatus according to claim 1, in which the free piston gauging apparatus is a load cell, and guide mechanism is provided for said ram including a low friction sleeve bearing having concentric tiers of bearing balls with a combined friction coefficient in the order of 0.002.

6. A free piston gauging apparatus according to claim 5, in which there is provided a sleeve of resilient material inserted between the sleeve ball bearing and the inner wall of said cylinder to maintain said ram in an accurately aligned position.

7. In a free piston gauging apparatus having a pair of pressure cylinders, each having a closed end and an open end disposed with the open ends facing one another in aligned relation, a piston and ram spacer assembly comprising a free piston in each of said cylinders, and a ram spacer separating said free pistons, a fluid-containing jacket surrounding each said cylinder, and means for supplying a fluid to each such jacket at an adjusted jacketing pressure for controlling the diameter of the inside wall of each said cylinder, means applying a loading force through the closed end of one of said cylinders to the associated piston, and means for supplying a balancing pressure through the closed end of the other said cylinder to the associated piston, the combination in which portions at least of each of said pistons are spherically formed providing an unbroken circular line contact between each piston and cylinder enclosing the area of each said piston precisely at said point of contact providing an exact measure of said piston area, and of the total pressure applied against each said piston area.

8. A free piston gauging apparatus according to claim 7, in which the free piston gauging apparatus is a multiplier-type deadweight tester having a loading pressure input cylinder and piston assembly of large diameter and a balancing pressure receiving cylinder and piston of smaller diameter, and means for supplying a balancing pressure to said balancing pressure receiving cylinder and piston.

9. A free piston gauging apparatus according to claim 7, in which the free piston gauging apparatus is a deadweight differential free piston gauge having a loading pressure input cylinder and piston assembly of small diameter, and a balancing pressure receiving cylinder and piston assembly of larger diameter, and means for supplying a balancing pressure to the larger cylinder and simultaneously to the smaller cylinder until the differential in pressure between the two cylinders becomes equal to the weight to be calibrated.

10. A free piston gauging device according to claim 7, in which the pistons and ram spacer are formed as an integral piston and ram spacer unit, each piston having spherically formed surfaces of sufficient extent to provide a line contact between said surfaces and the cylinder wall, and a ram spacer extending between and formed integral with said pistons loosely fitted within the respective cylinders.

* * * * *